(12) United States Patent
Yaguchi et al.

(10) Patent No.: US 7,596,271 B2
(45) Date of Patent: Sep. 29, 2009

(54) IMAGE PROCESSING SYSTEM AND IMAGE PROCESSING METHOD

(75) Inventors: Hiroyuki Yaguchi, Yokohama (JP); Shinichi Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 11/174,570

(22) Filed: Jul. 6, 2005

(65) Prior Publication Data
US 2006/0010116 A1    Jan. 12, 2006

(30) Foreign Application Priority Data
Jul. 7, 2004    (JP)    ............... 2004-200806

(51) Int. Cl.
*G06K 9/00*    (2006.01)
(52) U.S. Cl. ............... 382/181; 382/209
(58) Field of Classification Search ............ 382/181
See application file for complete search history.

(56) References Cited

U.S. PATENT DOCUMENTS

| | | | |
|---|---|---|---|
| 4,759,075 A | 7/1988 | Lipkie et al. | 382/46 |
| 4,908,873 A | 3/1990 | Philibert et al. | 382/34 |
| 4,935,821 A | 6/1990 | Sano et al. | 358/427 |
| 5,062,074 A * | 10/1991 | Kleinberger | 707/5 |
| 5,251,268 A | 10/1993 | Colley et al. | 382/14 |
| 5,642,435 A * | 6/1997 | Loris | 382/229 |
| 5,761,655 A * | 6/1998 | Hoffman | 707/4 |
| 5,761,689 A | 6/1998 | Rayson et al. | 707/533 |
| 5,848,186 A * | 12/1998 | Wang et al. | 382/176 |
| 5,859,662 A * | 1/1999 | Cragun et al. | 725/137 |
| 5,890,808 A * | 4/1999 | Neff et al. | 382/209 |
| 5,995,978 A * | 11/1999 | Cullen et al. | 707/104.1 |
| 6,043,823 A | 3/2000 | Kodaira et al. | 345/433 |
| 6,104,500 A * | 8/2000 | Alam et al. | 358/1.15 |
| 6,138,156 A | 10/2000 | Fletcher et al. | 709/224 |
| 6,275,610 B1 | 8/2001 | Hall, Jr. et al. | 382/180 |
| 6,275,850 B1 | 8/2001 | Beyda et al. | 709/206 |
| 6,301,586 B1 * | 10/2001 | Yang et al. | 707/104.1 |
| 6,360,252 B1 | 3/2002 | Rudy et al. | 709/206 |

(Continued)

FOREIGN PATENT DOCUMENTS

CN    1276569    12/2000

(Continued)

OTHER PUBLICATIONS

Scalable Vector Graphics (SVG) 1.1 Specification W3C Recommendation Jan. 14, 2003 http://www.w3c.org/TR/SVG11/.

(Continued)

*Primary Examiner*—Sath V Perungavoor
(74) *Attorney, Agent, or Firm*—Fitzpatrick, Cella, Harper & Scinto

(57) ABSTRACT

This invention provides an image processing system and image processing method which can specify and save an input image which matches a predetermined pattern and also simplify the determination process. Vector data is generated from image information input by a scanner. Keyword information to inhibit reuse, which is contained in the image information, is input. The similarity between the input vector data and the keyword information is determined. Only when it is determined that the vector data is similar to the keyword information, the generated vector data is stored in a storage device.

9 Claims, 19 Drawing Sheets

U.S. PATENT DOCUMENTS

| | | | |
|---|---|---|---|
| 6,397,213 B1* | 5/2002 | Cullen et al. | 707/5 |
| 6,434,552 B1* | 8/2002 | Leong | 707/4 |
| 6,466,694 B2 | 10/2002 | Kamada et al. | 382/181 |
| 6,470,336 B1* | 10/2002 | Matsukawa et al. | 707/4 |
| 6,580,820 B1 | 6/2003 | Fan | 382/135 |
| 6,658,145 B1* | 12/2003 | Silver et al. | 382/149 |
| 6,687,741 B1 | 2/2004 | Ramaley et al. | 709/206 |
| 6,707,568 B1 | 3/2004 | Yu | 358/1.15 |
| 6,741,743 B2* | 5/2004 | Stalcup et al. | 382/217 |
| 6,782,402 B1 | 8/2004 | Hidaka et al. | 707/203 |
| 6,799,717 B2* | 10/2004 | Harris | 382/317 |
| 6,944,344 B2* | 9/2005 | Imagawa et al. | 382/229 |
| 6,944,815 B2 | 9/2005 | Bierbrauer et al. | 715/500 |
| 6,977,754 B2 | 12/2005 | Matsumoto et al. | 358/1.9 |
| 7,085,437 B2 | 8/2006 | Nakajima et al. | 382/311 |
| 7,203,364 B2 | 4/2007 | Yamazaki | 382/177 |
| 7,240,077 B1 | 7/2007 | Edelman et al. | 707/203 |
| 7,248,744 B2 | 7/2007 | Cockshott | 382/253 |
| 2001/0014164 A1 | 8/2001 | Daniels et al. | 382/101 |
| 2002/0003633 A1 | 1/2002 | Matsumoto et al. | 358/1.9 |
| 2002/0037100 A1 | 3/2002 | Toda et al. | 382/166 |
| 2002/0071606 A1 | 6/2002 | Watanabe et al. | 382/177 |
| 2002/0141660 A1* | 10/2002 | Bellavita et al. | 382/309 |
| 2002/0196465 A1 | 12/2002 | Ohta | 358/1.16 |
| 2003/0019922 A1 | 1/2003 | Kuo et al. | 235/375 |
| 2003/0031371 A1 | 2/2003 | Kato et al. | 382/239 |
| 2003/0046352 A1 | 3/2003 | Katsuda et al. | 709/206 |
| 2003/0050933 A1 | 3/2003 | DeSalvo | 707/102 |
| 2003/0051044 A1 | 3/2003 | Parry et al. | 709/231 |
| 2003/0072500 A1 | 4/2003 | Sugegaya et al. | 382/305 |
| 2003/0085162 A1* | 5/2003 | Daniels et al. | 209/584 |
| 2003/0107771 A1 | 6/2003 | Shibata | 358/3.28 |
| 2003/0197891 A1 | 10/2003 | Honda | 358/1.15 |
| 2004/0010419 A1 | 1/2004 | Sinnott | 705/2 |
| 2004/0083434 A1* | 4/2004 | Fitch | 715/541 |
| 2004/0085327 A1 | 5/2004 | Jones et al. | 345/591 |
| 2004/0090641 A1 | 5/2004 | Namikata | 358/1.9 |
| 2004/0137416 A1* | 7/2004 | Ma et al. | 434/365 |
| 2004/0141613 A1 | 7/2004 | Hayashi | 380/28 |
| 2004/0148274 A1 | 7/2004 | Warnock et al. | 707/2 |
| 2004/0151377 A1 | 8/2004 | Boose et al. | 382/193 |
| 2004/0250083 A1 | 12/2004 | Schwab | 713/182 |
| 2005/0010868 A1* | 1/2005 | Schowtka et al. | 715/517 |
| 2005/0015379 A1 | 1/2005 | Aureglia et al. | 707/100 |
| 2005/0018237 A1* | 1/2005 | Cossel et al. | 358/1.15 |
| 2005/0023355 A1 | 2/2005 | Barrus | 235/462.15 |
| 2005/0071676 A1 | 3/2005 | Park et al. | 713/201 |
| 2005/0089229 A1 | 4/2005 | Morishita | 382/218 |
| 2005/0111052 A1 | 5/2005 | Nishikawa et al. | 358/448 |
| 2005/0111053 A1* | 5/2005 | Yoshida et al. | 358/448 |
| 2005/0123209 A1 | 6/2005 | Kitora et al. | 382/243 |
| 2005/0134906 A1* | 6/2005 | Takashima | 358/1.15 |
| 2005/0144136 A1 | 6/2005 | Murashita | 705/51 |
| 2005/0262243 A1 | 11/2005 | Ternasky et al. | 709/225 |
| 2005/0271296 A1 | 12/2005 | Tsuji et al. | 382/275 |
| 2005/0286805 A1 | 12/2005 | Yoshida | 382/305 |
| 2005/0288943 A1 | 12/2005 | Wei et al. | 705/1 |
| 2006/0007481 A1 | 1/2006 | Kato et al. | 358/1.15 |
| 2006/0008113 A1 | 1/2006 | Matsukubo et al. | 382/100 |
| 2006/0008114 A1 | 1/2006 | Sekiguchi et al. | 382/100 |
| 2006/0010115 A1 | 1/2006 | Yoshida et al. | 707/3 |
| 2006/0116993 A1* | 6/2006 | Oguri et al. | 707/3 |
| 2006/0143153 A1* | 6/2006 | Mifune et al. | 707/1 |

FOREIGN PATENT DOCUMENTS

| | | |
|---|---|---|
| CN | 1277410 | 12/2000 |
| EP | 1 058 199 A2 | 12/2000 |
| GB | 2 313 729 A | 12/1997 |
| JP | 2-184173 | 7/1990 |
| JP | 4-34650 | 2/1992 |
| JP | 4-302073 | 10/1992 |
| JP | 5-12402 | 1/1993 |
| JP | 5-28254 | 2/1993 |
| JP | 5-303644 | 11/1993 |
| JP | 5-334430 | 12/1993 |
| JP | 5-342408 | 12/1993 |
| JP | 6-46271 | 2/1994 |
| JP | 6-119448 | 4/1994 |
| JP | 6-178066 | 6/1994 |
| JP | 6-270477 | 9/1994 |
| JP | 6-290264 | 10/1994 |
| JP | 7-36433 | 2/1995 |
| JP | 7-85221 | 3/1995 |
| JP | 8-242326 | 9/1996 |
| JP | 9-50433 | 2/1997 |
| JP | 10-293737 | 11/1998 |
| JP | 11-185018 | 7/1999 |
| JP | 11-232296 | 8/1999 |
| JP | 11-284835 | 10/1999 |
| JP | 11-312244 | 11/1999 |
| JP | 2000-261574 | 9/2000 |
| JP | 2000-322425 | 11/2000 |
| JP | 2001-57631 | 2/2001 |
| JP | 2001-218030 | 8/2001 |
| JP | 2003-22307 | 1/2003 |
| JP | 2003-107119 | 4/2003 |
| JP | 2003-134327 | 5/2003 |
| JP | 2003-169169 | 6/2003 |
| JP | 2003-248832 | 9/2003 |

OTHER PUBLICATIONS

Chinese Office Action dated Apr. 27, 2007, regarding Application No. 2005100832530.

Chinese Office Action dated May 11, 2007, regarding Application No. 2005100838039.

* cited by examiner

FIG. 5

BLOCK INFORMATION

| | PROPERTY | COORDINATE X | COORDINATE Y | WIDTH W | HEIGHT H | OCR INFORMATION |
|---|---|---|---|---|---|---|
| BLOCK 1 | 1 | X1 | Y1 | W1 | H1 | AVAILABLE |
| BLOCK 2 | 3 | X2 | Y2 | W2 | H2 | AVAILABLE |
| BLOCK 3 | 2 | X3 | Y3 | W3 | H3 | NOT AVAILABLE |
| BLOCK 4 | 1 | X4 | Y4 | W4 | H4 | AVAILABLE |
| BLOCK 5 | 3 | X5 | Y5 | W5 | H5 | AVAILABLE |
| BLOCK 6 | 5 | X6 | Y6 | W6 | H6 | NOT AVAILABLE |

PROPERTY 1 : text  2 : picture  3 : table  4 : line  5 : photo

INPUT FILE INFORMATION

| TOTAL NUMBER OF BLOCKS | N(=6) |
|---|---|

IMAGE PROCESSING SYSTEM AND IMAGE PROCESSING METHOD

FIELD OF THE INVENTION

The present invention relates to an image processing system and image processing method, which convert input image information into a predetermined format.

BACKGROUND OF THE INVENTION

Along with a recent growing interest in environmental issues, move to paperless offices has rapidly been promoted. For this purpose, there is conventionally known a document management system which reads paper documents accumulated in binders by using a scanner, converts the read images into portable document format (to be abbreviated as "PDF" hereinafter) data, and accumulates them in an image storage device as a database.

Under these circumstances, even a forbidden document can sometimes easily be copied and carried out. To know when information that should not be printed has been printed and who has printed it, a method of saving an input image as image data is known (e.g., Japanese Patent Laid-Open No. 6-270477).

Another method is also known in which input image data is compared with a predetermined image, thereby determining whether the data is information which should not be printed (e.g., Japanese Patent Laid-Open No. 6-178066).

However, the former method requires an image storage area with an enormous capacity to accumulate image data each having a large data amount in the image processing system. The latter method can cope with a change in various directions. However, to inhibit printing of data matching a given keyword, patterns corresponding to various volumes and sizes must be generated in correspondence with the same keyword, resulting in a cumbersome determination process.

SUMMARY OF THE INVENTION

The present invention has been proposed to solve the conventional problems, and has as its object to provide an image processing system and image processing method which can specify and save an input image which matches a predetermined pattern and also simplify the determination process.

In order to solve the above-described problems, according to the present invention, there is provided an image processing system comprising:

an input unit adapted to input image information:
a vectorization unit adapted to generate vector data from the image information input by the input unit;
an object information input unit adapted to input predetermined object information;
a determination unit adapted to determine whether information similar to the object information input by the object information input unit is contained in the vector data generated by the vectorization unit; and
a storage unit adapted to, when the determination unit determines that the object information is contained in the vector data, store the vector data in correspondence with specific property information.

In order to solve the above-described problems, according to the present invention, there is provided an image processing method comprising:

an input step of inputting image information:
a vectorization step of generating vector data from the image information input in the input step;
an object information input step of inputting predetermined object information;
a determination step of determining whether information similar to the object information input in the object information input step is contained in the vector data generated in the vectorization step; and
a storage step of, when it is determined in the determination step that the object information is contained in the vector data, storing the vector data in correspondence with specific property information.

In order to solve the above-described problems, according to the present invention, there is provided an image processing system comprising:

an input unit adapted to input image information;
a holding unit adapted to hold a predetermined keyword;
an identification unit adapted to identify keyword information contained in the image information input by the input unit;
a determination unit adapted to determine whether the keyword held by the holding unit matches the keyword information identified by the identification unit; and
a storage unit adapted to, when the determination unit determines that the keyword matches the keyword information, store the image information input by the input unit in correspondence with specific property information.

In order to solve the above-described problems, according to the present invention, there is provided an image processing method comprising:

an input step of inputting image information;
a holding step of holding a predetermined keyword;
an identification step of identifying keyword information contained in the image information input in the input step;
a determination step of determining whether the keyword held in the holding step matches the keyword information identified in the identification step; and
a storage step of, when it is determined in the determination step that the keyword matches the keyword information, storing the image information input in the input step in correspondence with specific property information.

Other feature and advantages of the present invention will be apparent from the following description taken in conjunction with the accompanying drawings, in which like references characters designate the same or similar parts throughout the figures thereof.

BRIEF DESCRIPTION OF THE DRAWINGS

The accompanying drawings, which are incorporates in and constitute a part of the specification, illustrate embodiments of the invention and, together with the description, serve to explain the principle of the invention.

FIG. 5 is a table showing an example of block information of respective blocks obtained by the block selection process;

DETAILED DESCRIPTION OF THE PREFERRED EMBODIMENT

An image processing system and image processing method according to a preferred embodiment of the present invention will be described below with reference to the accompanying drawings.

Figure 1:
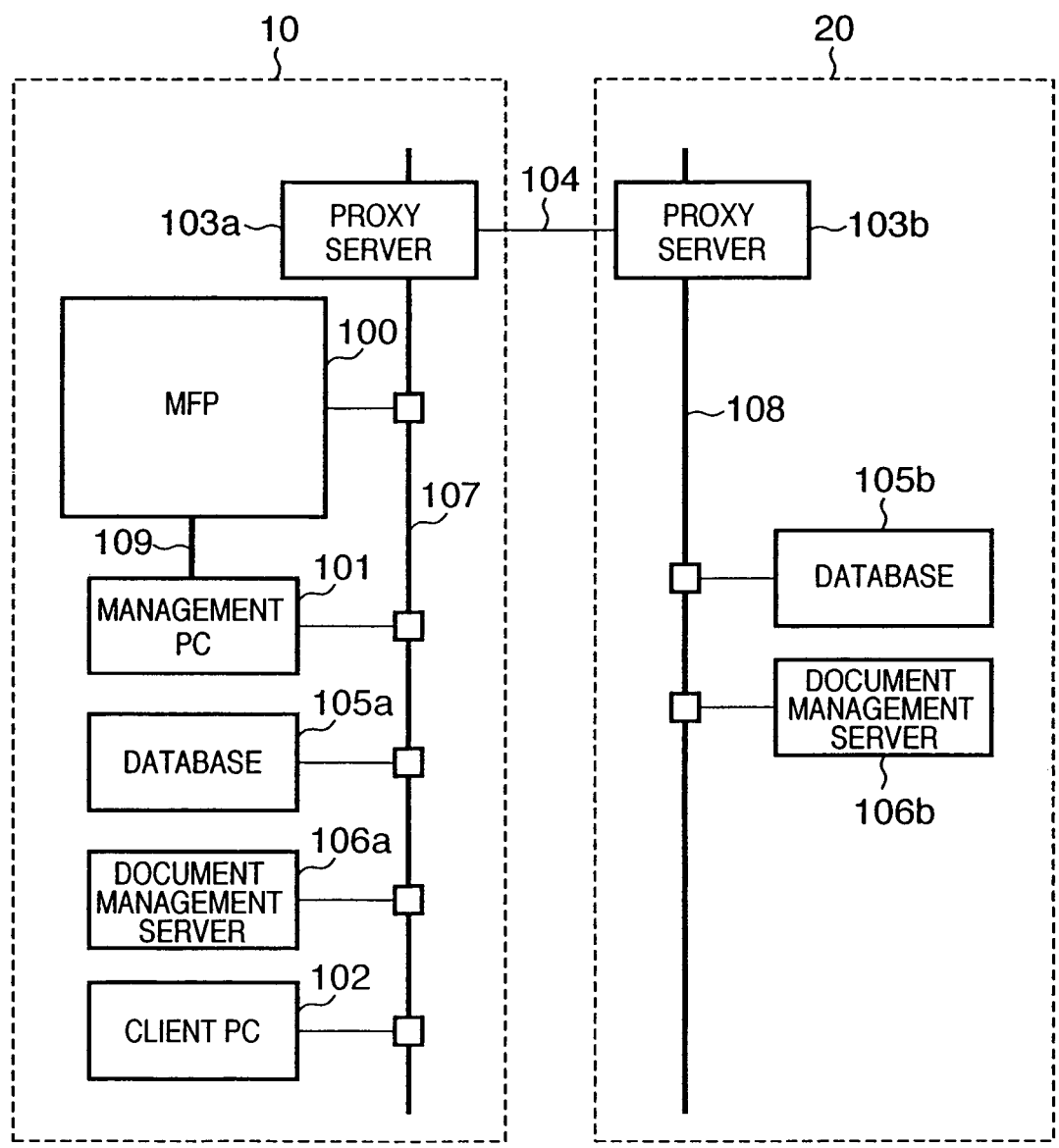
FIG. 1 is a block diagram showing the arrangement of an image processing system according to an embodiment of the present invention.

FIG. 1 is a block diagram showing the arrangement of an image processing system according to an embodiment of the present invention. The image processing system shown in FIG. 1 is implemented in an environment in which offices 10 and 20 are connected via an network 104 such as the Internet.

A digital multifunction peripheral (MFP) 100, a management PC 101 which controls the MFP 100, a client PC 102, a document management server 106a, a database 105a, and a proxy server 103a are connected to a LAN 107 formed in the office 10. The MFP 100 can be implemented by, e.g., a copying machine or facsimile apparatus having a multifunction. A document management server 106b, database 105b, and proxy server 103b are connected to a LAN 108 formed in the office 20. The client PC 102 comprises an external storage unit, search image input unit, and search result output unit. The LAN 107 and the LAN 108 in the office 20 are connected to the network 104 such as the Internet via the proxy servers 103a and 103b, respectively.

The MFP 100 in this embodiment is in charge of an image reading process of optically reading a paper document and converting it into an image signal and some of image processes for the read image signal, and inputs the image signal to the management PC 101 via a LAN 109. The management PC 101 can also be implemented by a normal PC and incorporates an image storage unit, image processing unit, display unit, and input unit. The management PC 101 may partially or wholly be integrated with the MFP 100.

Figure 2:
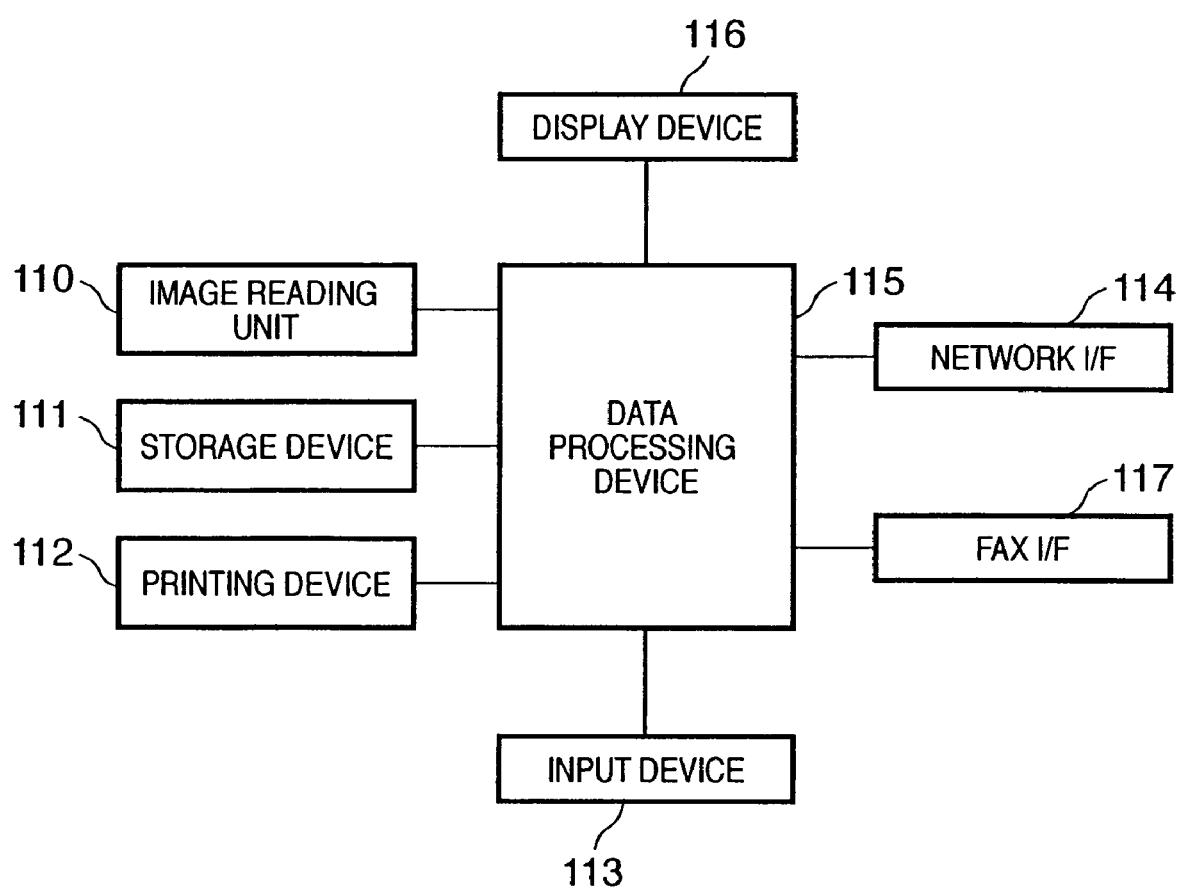
FIG. 2 is a block diagram showing the arrangement of an MFP 100 according to the embodiment of the present invention.

FIG. 2 is a block diagram showing the arrangement of an MFP 100 according to the embodiment of the present invention. An operator's instruction to the MFP 100 is input through an input device 113 such as keys equipped on the MFP 100 or an input device including a keyboard and mouse of a management PC 101. The series of operations is controlled by a controller in a data processing device 115.

Referring to FIG. 2, an authentication device 118 requests the user to input authentication information (e.g., a personal ID or password) and issues for the operator an access permission to the MFP 100 on the basis of the authentication information such as the user's personal ID or password input from the input device 113. If it is determined on the basis of the authentication result by the authentication device 118 that the user is permitted to access, an image reading device 110 including an auto document feeder (to be abbreviated as an "ADF" hereinafter) irradiates a document image on each of one or a plurality of stacked documents with light from an internal light source, forms an image of light reflected by the document on a solid-state image sensing element via a lens, and obtains an image reading signal in the raster order as image information at a resolution of, e.g., 600 dpi from the solid-state image sensing element. When a normal copying function is used, the data processing device 115 executes an image process of that image signal to convert it into a recording signal. In case of a multi-copying process, recording data of one page is temporarily stored in a storage device 111 and sequentially output to a printing device 112, and then images are formed on paper sheets.

Print data output from a client PC 102 is input from a LAN 107 to the MFP 100 and to the data processing device 115 via a network I/F 114 and converted into recordable raster data by the data processing device 115. The raster data is then input to the printing device 112 to form a recording image on a paper sheet.

Status of operation inputs and image data whose process is underway are displayed on a display device 116 of the MFP 100 or on the monitor of the management PC 101 or client PC 102. The storage device 111 stores image data which is read by the image reading device 110 and processed by the data processing device 115. The storage device 111 can also be controlled from the management PC 101. Data exchange and control between the MFP 100 and management PC 101 are done by using the network I/F 114 and a directly connected LAN 109.

Scan data can also be transmitted to a set transmission destination by using a facsimile (FAX) I/F 117. Received data from the FAX I/F 117 can also be printed by using the printing device 112. The FAX reception data can also be transferred to a set destination through the network I/F 114. Data received from the network I/F 114 can also be transferred by using the FAX I/F 117.

[Outline of Reading Process]

Figure 3:
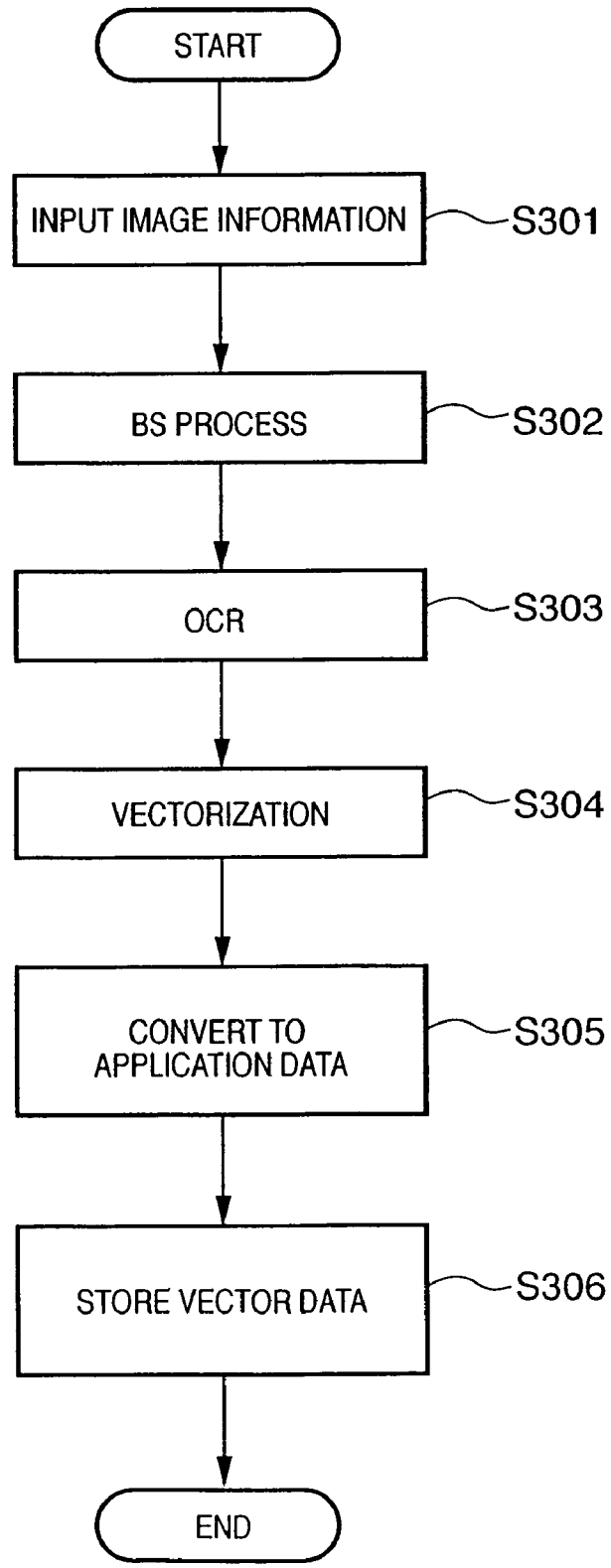
FIG. 3 is a flowchart for explaining the image process procedures of the image processing system according to the embodiment of the present invention.

An outline of the entire image process of the image processing system according to the embodiment of the present invention will be described below. FIG. 3 is a flowchart for explaining the image process procedures of the image processing system according to the embodiment of the present invention. A process of acquiring image information by reading a paper document will be described with reference to the flowchart in FIG. 3.

The image reading device 110 of the MFP 100 is operated to scan one document in a raster order to obtain an, e.g., 8-bit image signal of 600 dpi (image information input process:

step S301). This image signal undergoes a pre-process by the data processing device 115 and is saved as image data of one page in the storage device 111.

A CPU in the data processing device 115 or the CPU of the management PC 101 separates text/line art portions and halftone image portions from the image signal stored in the storage device 111. Each text portion is further separated into blocks combined as clusters for the respective paragraphs or tables and graphics formed of lines. The separated parts are segmented. On the other hand, each image portion expressed by halftone is segmented into independent objects for the respective so-called blocks such as an image portion and background portion which are separated into rectangles (BS process: step S302).

An OCR process is executed to recognize the character size, style, and font of the text block (step S303). The data is converted into font data (including character codes) which are visually faithful to characters read by scanning the document so that vector data is generated (step S304). For a table or graphic block formed of lines, the outline is specified to generate vector data. An image block is processed as an individual JPEG file as image information. These vectorization processes are done for the respective objects, and layout information of each object is saved. With the process in step S304, image information is converted into vector data so that the data is converted into a digital file close to the original digital file.

Data whose vector data is permitted to reuse is converted into application data having a format such as an rtf file processible by general-purpose document creation software (step S305) and stored in the storage device 111 as a digital file (step S306).

Each process block will be described below in detail.

The block selection (BS) process in step S302 will be described below.

[Block Selection Process]

Figure 4:
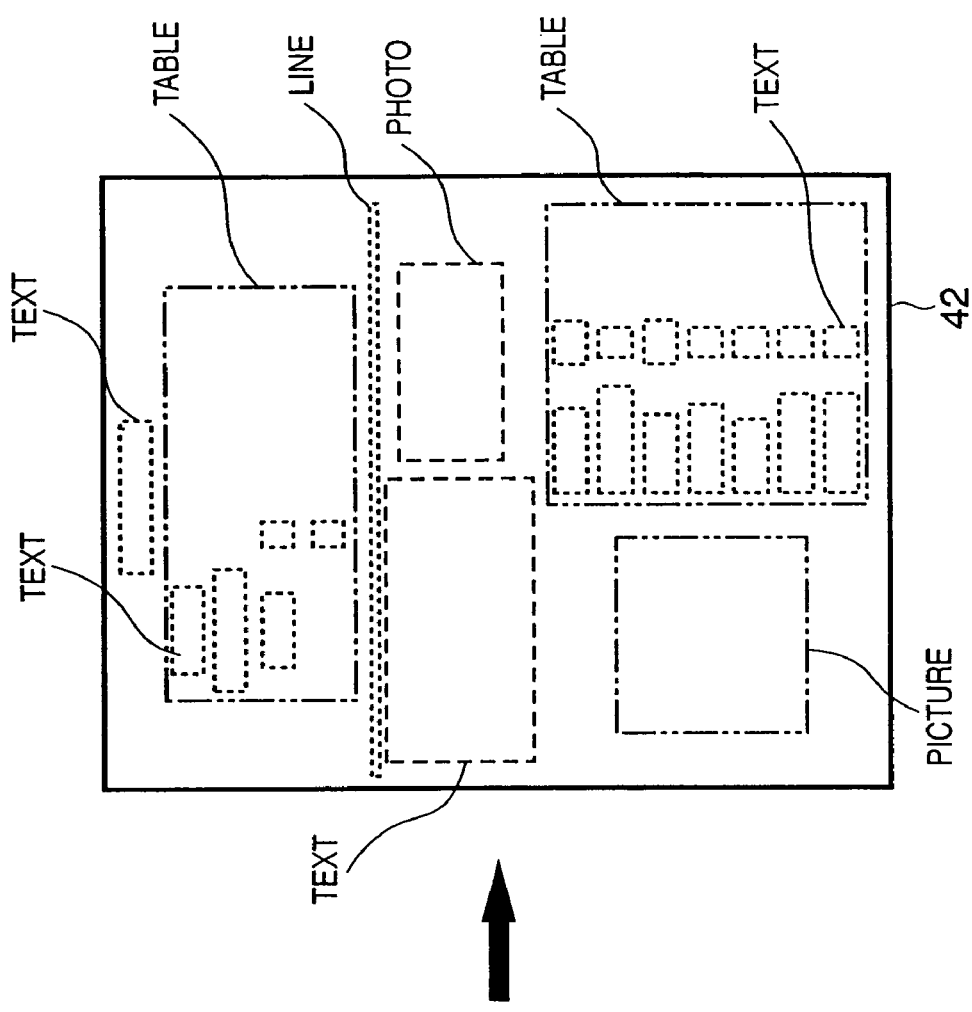
FIG. 4 is a view showing a state wherein read image data of one page is segmented into a plurality of blocks by a block selection process by determining properties.
Figure 4:
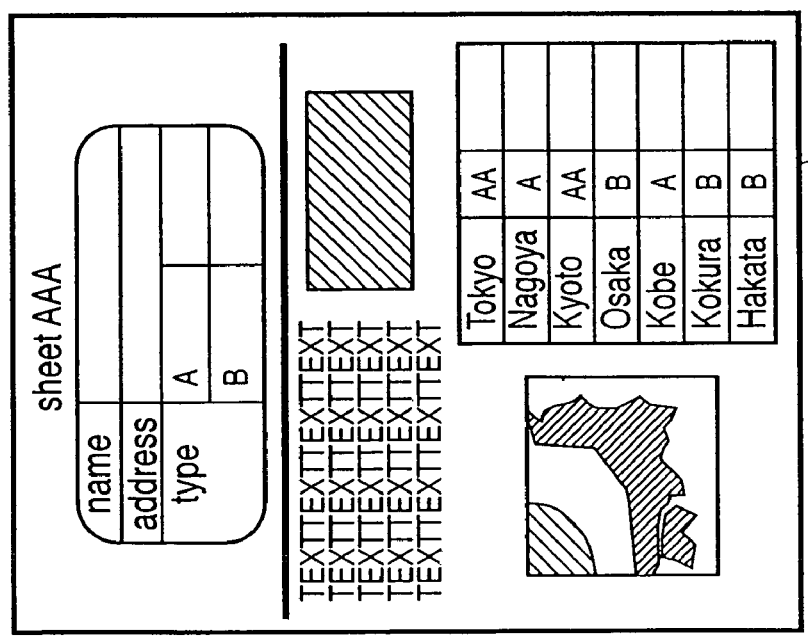

FIG. 4 is a view showing a state wherein read image data of one page is segmented into a plurality of blocks by a block selection process by determining properties. More specifically, in the block selection process, image data 41 of one page read in step S301 is recognized as a cluster 42 of objects, and the properties of the respective blocks are determined as text (TEXT), photo (PHOTO), line (LINE), table (TABLE), and the like so that the image data is segmented into regions (blocks) having different properties.

An embodiment of the block selection process will be described below.

An input image is binarized to monochrome image data. Outline tracking is executed to extract a cluster of pixels surrounded by black pixels. For a black pixel cluster having a large area, outline tracking is executed for white pixels in that cluster to extract a cluster of white pixels. A cluster of black pixels is also extracted recursively from a white pixel cluster having a predetermined area or more. The above-described process is executed for a document having black characters printed on a white background. A document of another type can be processed in the same way by setting the color corresponding to the background to "white" and that corresponding to an object to "black".

The obtained black pixel clusters are classified into regions having different properties in accordance with their sizes and shapes. For example, a pixel cluster having an aspect ratio of almost 1 and a size in a predetermined range is determined as a pixel cluster corresponding to a character. Furthermore, a portion where neighboring characters regularly line up and can be regarded as a group is determined as a text region. A low-profile pixel cluster is categorized as a line region. A range occupied by a black pixel cluster which includes rectangular white pixel clusters which regularly line up and have a predetermined size or more is categorized as a table region. A region where pixel clusters with indeterminate forms are distributed is categorized as a photo region. A cluster with an arbitrary shape is categorized as a graphic region. With this process, more advanced limits can be imposed for reuse of digital data created by reading one document.

FIG. 5 is a table showing an example of block information of respective blocks obtained by the block selection process. Information of each block shown in FIG. 5 is used as information for vectorization or search to be described later.

[Vectorization Process]

The vectorization process in step S304 in FIG. 3 will be described next. For a text block, a character recognition process is executed for each character.

<<Character Recognition>>

For the character recognition process, in this embodiment, an image extracted for each character is recognized by using one of pattern matching methods, thereby obtaining a corresponding character code. In this recognition process, an observation feature vector obtained by converting a feature obtained from a character image into a several-ten-dimensional numerical value string is compared with a dictionary feature vector obtained in advance for each character type, and a character type with a shortest distance is output as a recognition result. Various known methods are available for feature vector extraction. For example, a method of dividing a character into a mesh pattern and counting character lines in respective meshes as line elements depending on their directions to obtain a (mesh count)-dimensional vector as a feature can be used.

When character recognition is to be executed for a text region extracted by the block selection process (step S302), the writing direction (horizontal or vertical direction) of the region is determined. Lines are extracted in the direction. Then, character images are obtained by extracting characters. In determining the writing direction (horizontal or vertical direction), horizontal and vertical projections of pixel values in that region are calculated. If the variance of the horizontal projection is larger than that of the vertical projection, the region is determined as a horizontal writing region. Otherwise, the region is determined as a vertical writing region.

Decomposition into character strings and characters is done in the following way. For horizontal writing, lines are extracted by using the horizontal projection. In addition, characters are extracted on the basis of the vertical projection for each extracted line. For a vertical writing text region, the relationship between "horizontal" and "vertical" is reversed. The character size can be detected on the basis of the extracted size.

<<Font Recognition>>

A plurality of sets of dictionary feature vectors for the number of character types used in character recognition are prepared in correspondence with character shape types, i.e., font types, and a font type is output together with a character code upon matching, thus recognizing the font of a character.

<<Vectorization of Character>>

In this embodiment, in vectorizing a character, using a character code and font information obtained by the above-described character recognition and font recognition, the information of a character portion is converted into vector data by using outline data prepared in advance. When an input document image is a color image, the color of each character is extracted from the color image and recorded together with vector data.

With the above processes, image information which belongs to a text block can be converted into vector data with a nearly faithful shape, size, and color. Hence, high-quality character data can be handled.

<<Vectorization of Non-Text Portion>>

For a region which is determined as a drawing, line, or table region by the block selection process in step S302, the outline of each extracted pixel cluster is converted into vector data. More specifically, a point sequence of pixels which form an outline is divided into sections at a point considered as a corner, and each section is approximated by a partial line or curve. "Corner" indicates a point where the curvature is maximal.

Figure 6:
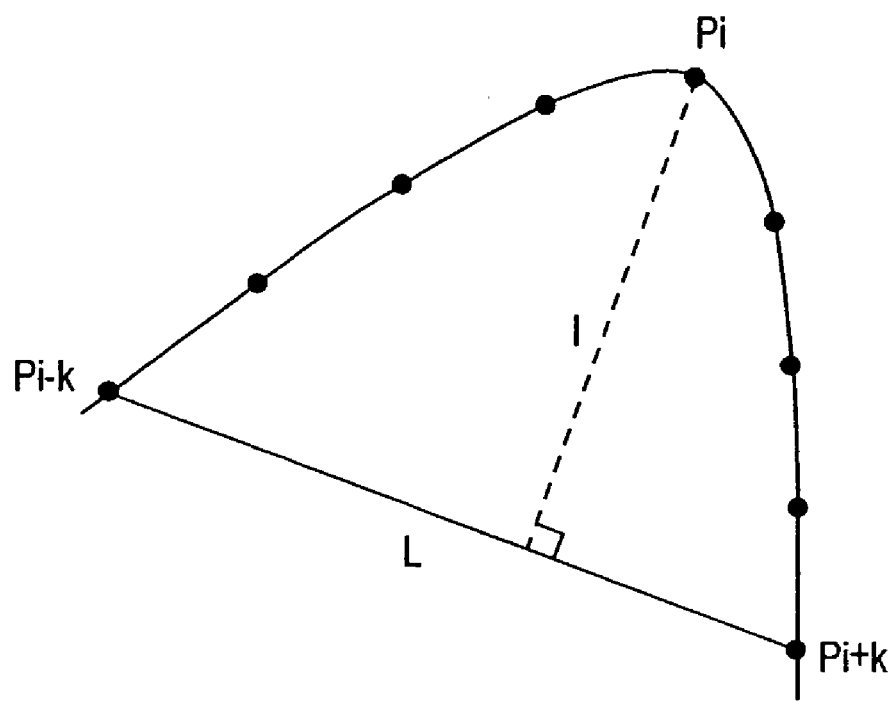
FIG. 6 is a view for explaining a point with a maximal curvature.

FIG. 6 is a view for explaining a point with a maximal curvature. As shown in FIG. 6, a chord is drawn between points Pi−k and Pi+k separated k points from an arbitrary point Pi to the left and right. A point with a maximal curvature is obtained as a point where the distance between the chord and the point Pi becomes maximal. Let R be the chord length/arc length between Pi−k and Pi+k. Then, a point where the value R is equal to or smaller than a threshold value can be regarded as a corner. Sections obtained by dividing the line at corners can be vectorized by using a method of least squares with respect to a point sequence for a line and a ternary spline function for a curve.

When the subject has an inner outline, it is similarly approximated by a partial line or curve by using a point sequence of a white pixel outline extracted by the block selection process.

As described above, when partial line approximation of outlines is used, the outline of a graphic with an arbitrary shape can be vectorized. When the input document is a color document, the color of each graphic is extracted from the color image and is recorded together with vector data.

Figure 7:
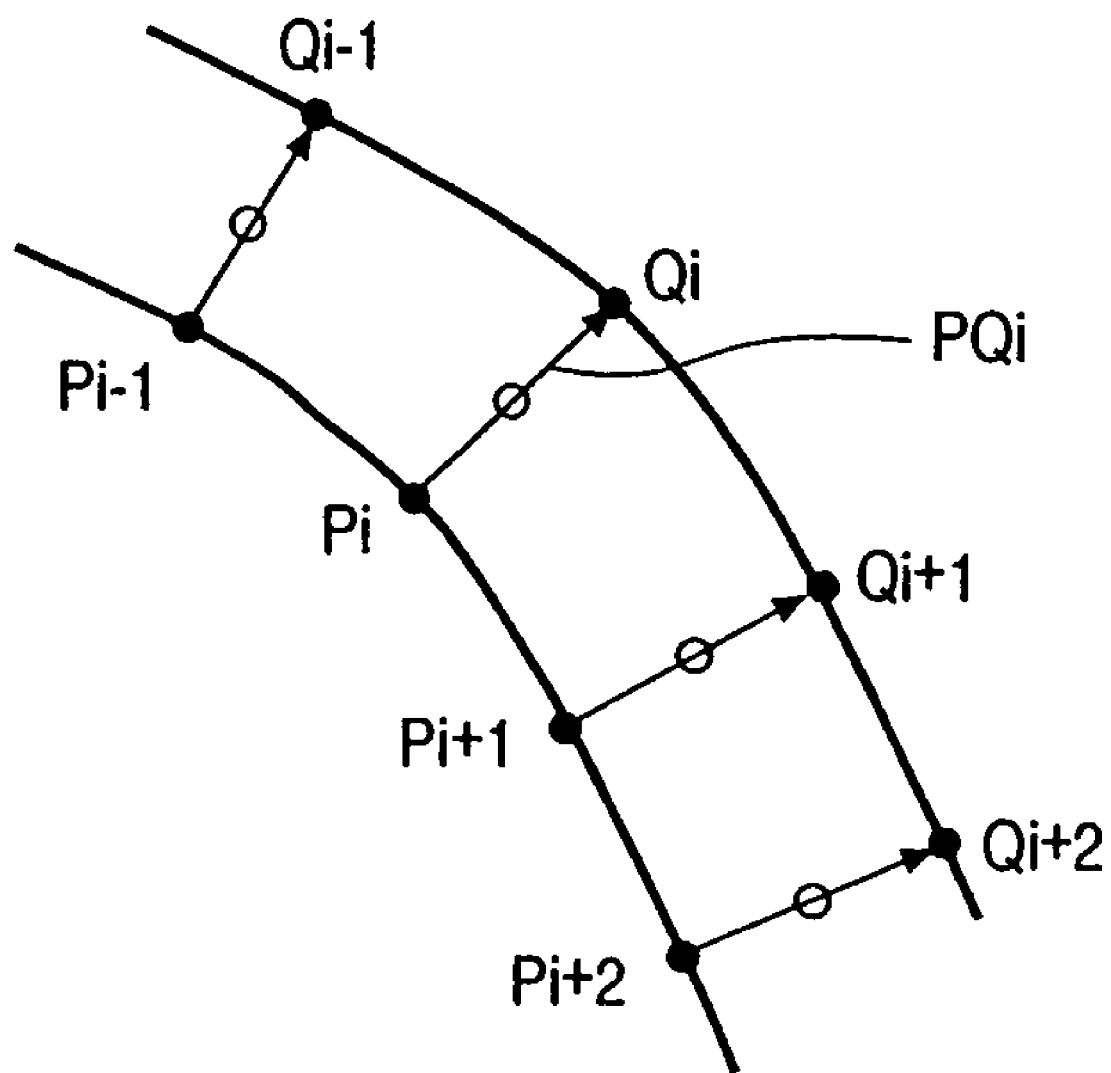
FIG. 7 is a view for explaining an example wherein an outer outline which is close to an inner outline or another outer outline is expressed as a line with a given width.

FIG. 7 is a view for explaining an example wherein an outer outline which is close to an inner outline or another outer outline is expressed as a line with a given width. When an outer outline is close to an inner outline or another outer outline in a given section, as shown in FIG. 7, the two outlines can combined and expressed as a line with a given width. More specifically, lines are drawn from points Pi on a given outline to points Qi on another outline such that two corresponding points have the shortest distance. When distances PQi maintain a predetermined value or less on the average, the section of interest is approximated by a line or curve using PQi middle points as a point sequence, and the average value of the distances PQi is set as the width of the line or curve. A line or a table ruled line as a set of lines can efficiently be expressed by vector data as a set of lines having a given width, as described above.

In vectorization using the character recognition process for a text block, a character which has the shortest distance from a dictionary as a result of the character recognition process is used as a recognition result, as described above. When this distance is equal to or larger than a predetermined value, the recognition result does not always match an original character, and a wrong character having a similar shape is often recognized. In this embodiment, therefore, such character is handled in the same manner as a general line art, as described above, and converted into outline data. That is, even a character that causes a recognition error in the conventional character recognition process can be vectorized on the basis of outline data which is visually faithful to image data without being vectorized to a wrong character. In this embodiment, a block which is determined as a photo is not vectorized and is output as image data without any process.

[Graphic Recognition]

A process of grouping vectorized partial lines for each graphic object after the outline of a graphic with an arbitrary shape is vectorized, as described above, will be described below.

Figure 8:
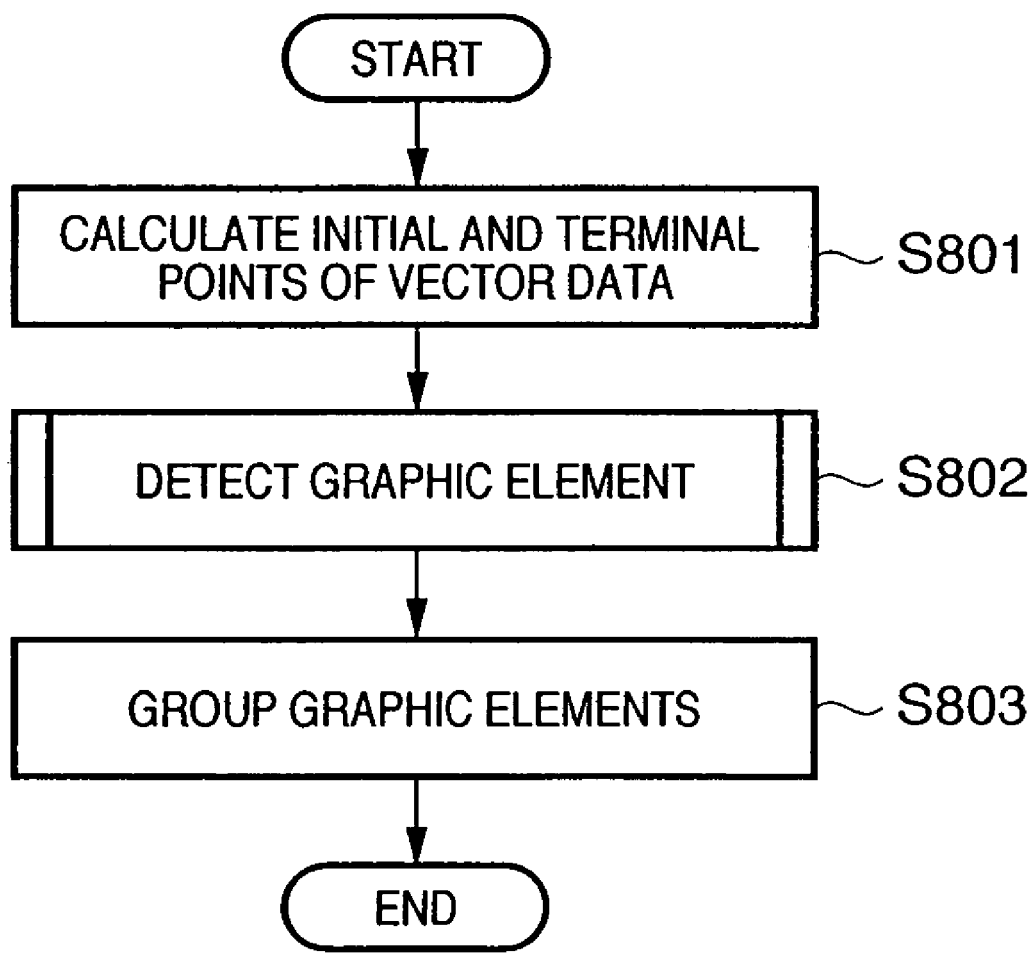
FIG. 8 is a flowchart for explaining process procedures executed until vector data are grouped for each graphic object.

FIG. 8 is a flowchart for explaining process procedures executed until vector data are grouped for each graphic object. Initial and terminal points of each vector data are calculated (step S801). Using the initial and terminal point information of respective vectors, a graphic element is detected (step S802). Detecting a graphic element is to detect a closed graphic formed by partial lines. Detection is executed by applying the principle that each vector which forms a closed shape has vectors coupled to its two ends.

Next, other graphic elements or partial lines present in the graphic element are grouped to set one graphic object (step S803). If any other graphic elements or partial lines are not present in the graphic element, the graphic element is set as a graphic object.

Figure 9:
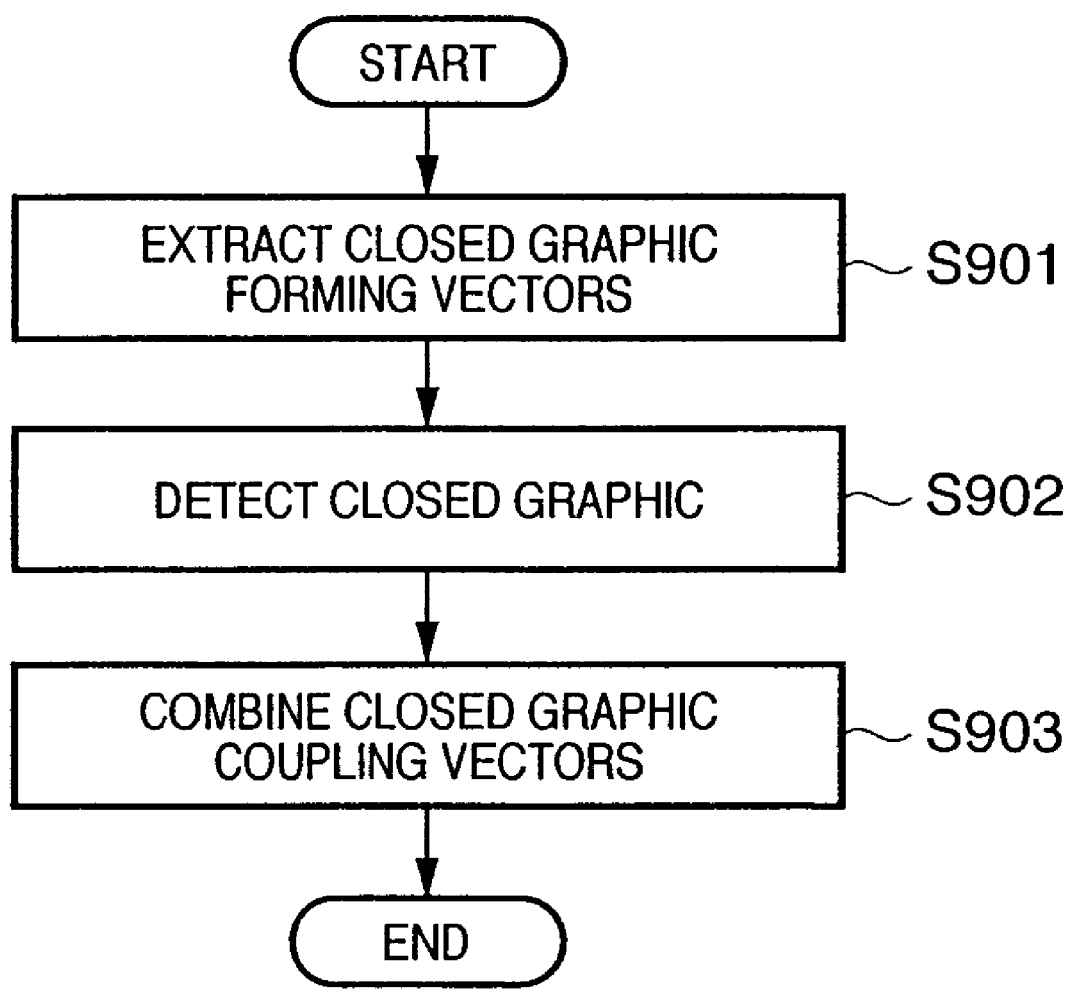
FIG. 9 is a flowchart for explaining process procedures of detecting a graphic element.

FIG. 9 is a flowchart for explaining process procedures of detecting a graphic element. Unwanted vectors each having two ends unconnected to other vectors are removed from vector data to extracted closed graphic forming vectors (step S901). The initial point of a vector of interest of the closed graphic forming vectors is set as a start point, and vectors are sequentially tracked clockwise. This tracking is executed until returning to the start point. All passing vectors are grouped as a closed graphic which forms one graphic element (step S902). All closed graphic forming vectors present in the closed graphic are also grouped. The initial point of a vector which is not grouped yet is set as a start point, and the above process is repeated. Finally, of the unwanted vectors removed in step S901, those which join the vectors grouped as the closed graphic in step S902 are detected and grouped as one graphic element (step S903).

With the above process, a graphic block can be handled as an independently reusable graphic object.

[Conversion Process into Application Data]

Figure 10:
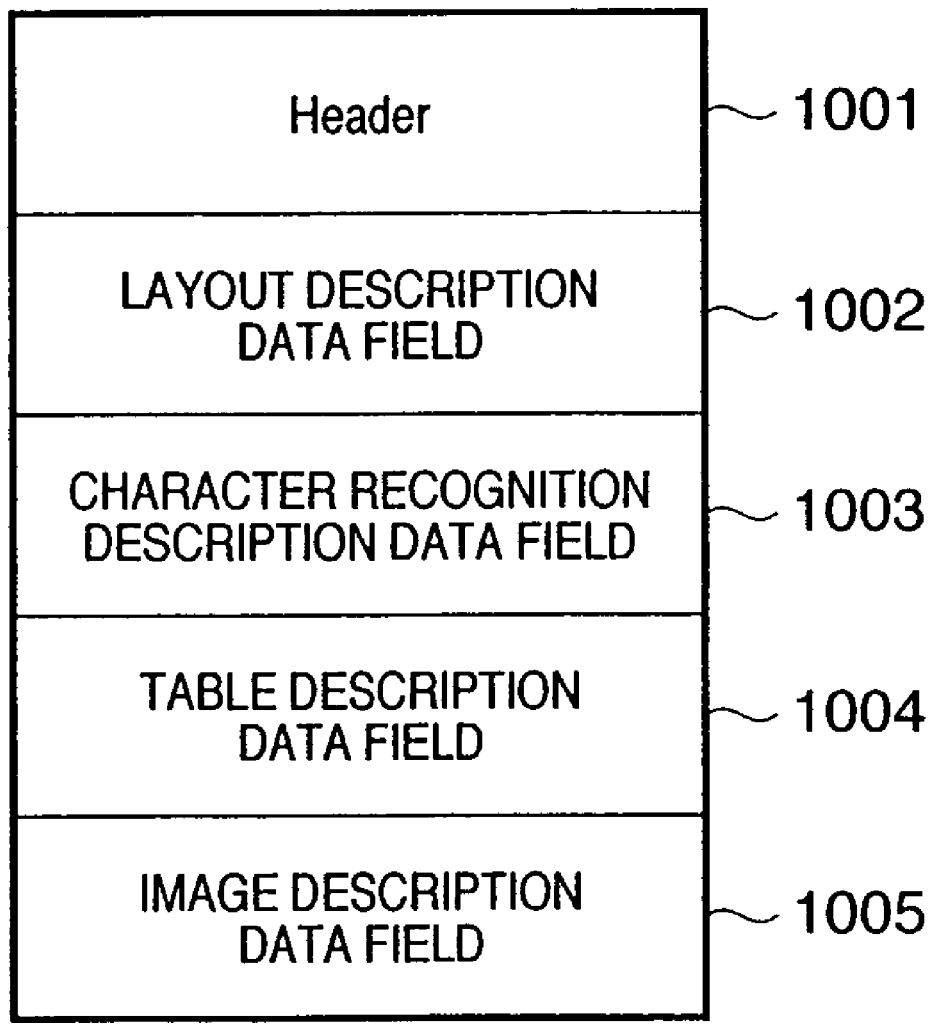
FIG. 10 is a view showing the data structure of an intermediate data format as a result obtained by converting image data of one page by the block selection process (step S302) and vectorization process (step S304)

FIG. 10 is a view showing the data structure of a file having an intermediate data format as a result obtained by converting image data of one page by the block selection process (step S302) and the vectorization process (step S304). The data format shown in FIG. 10 is called a document analysis output format (DAOF). That is, FIG. 10 shows the DAOF data structure.

Referring to FIG. 10, reference numeral 1001 denotes a Header which holds information about document image data to be processed. Reference numeral 1002 denotes a layout description data field which holds property information and rectangular block address information of blocks in the document image data, which are recognized for the properties such as TEXT (text), TITLE (title), CAPTION (caption), LINEART (line art), PICTURE (natural image), FRAME (frame), and TABLE (table).

Such DAOF data itself is sometimes saved as a file in place of intermediate data. However, in the state of a file, individual objects cannot be reused by a general document creation application. A process of converting DAOF data into application data (step S306) will be described next in detail.

Figure 11:
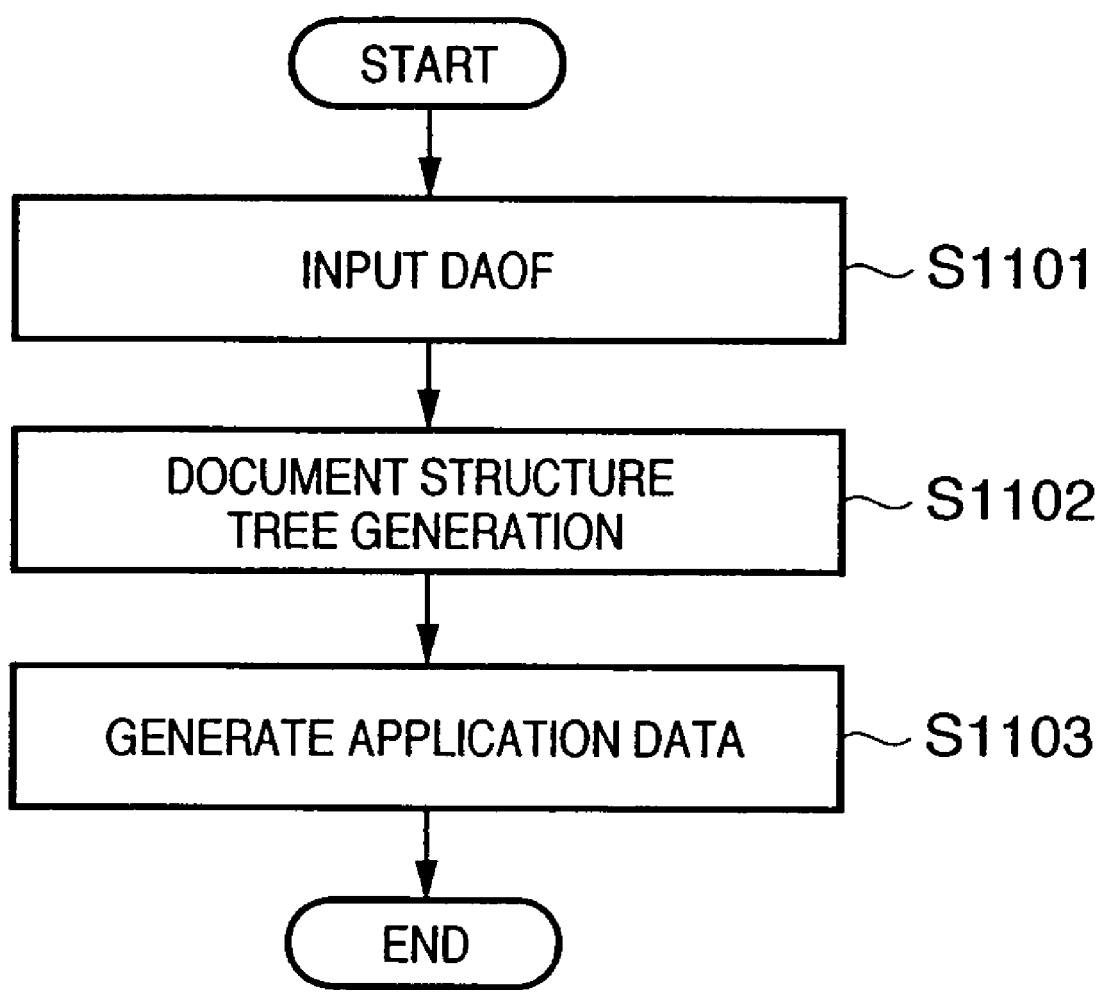
FIG. 11 is a flowchart for explaining schematic procedures of the overall conversion process into application data.

FIG. 11 is a flowchart for explaining schematic procedures of the overall conversion process into application data. DAOF data is input (step S1101). A document structure tree serving as a base of application data is generated (step S1102). Actual data in the DAOF are input on the basis of the generated document structure tree to generate actual application data (step S1103).

Figure 12:
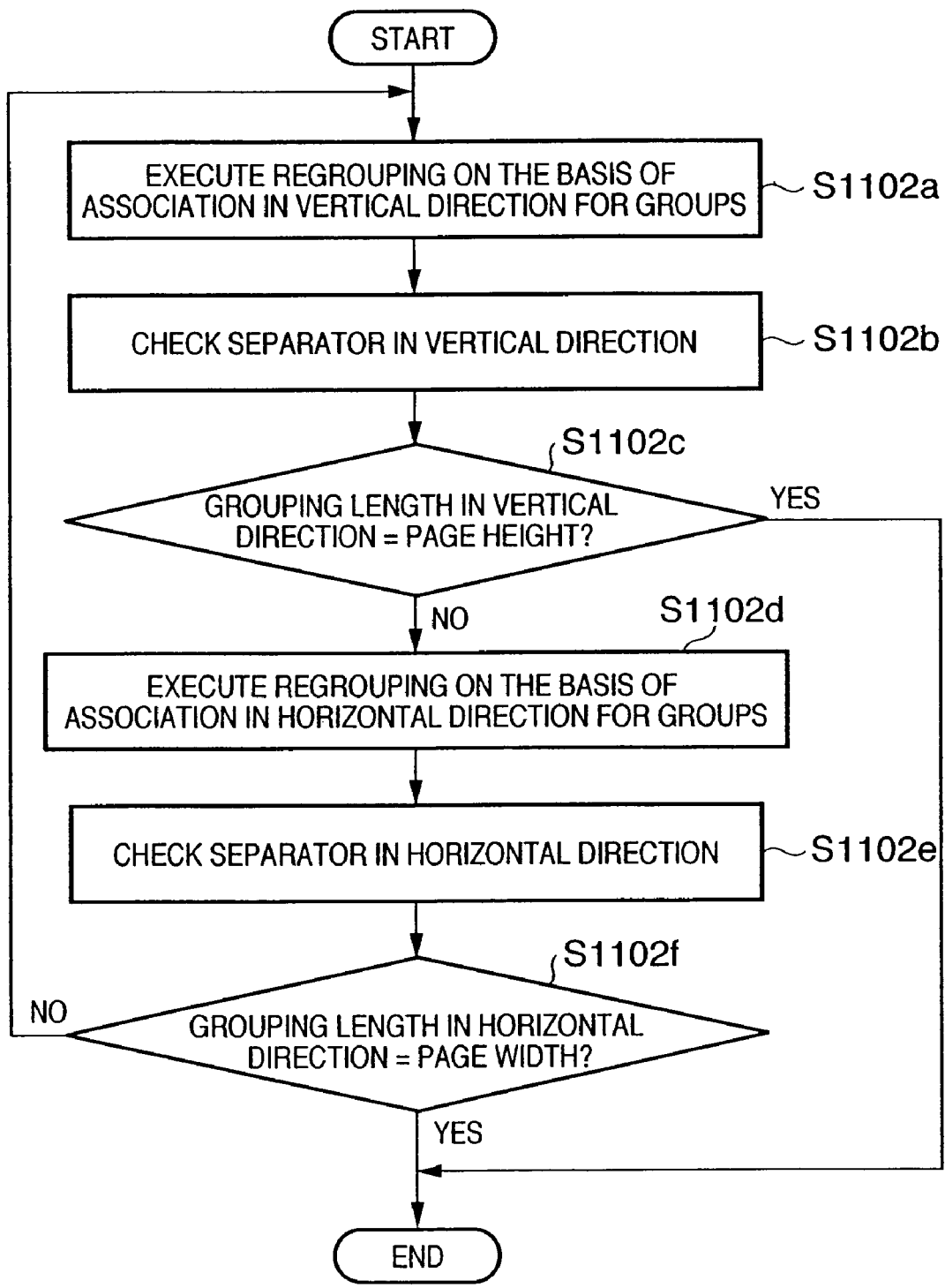
FIG. 12 is a flowchart for explaining detailed process procedures of a document structure tree generation process (step S802)
Figure 13A:
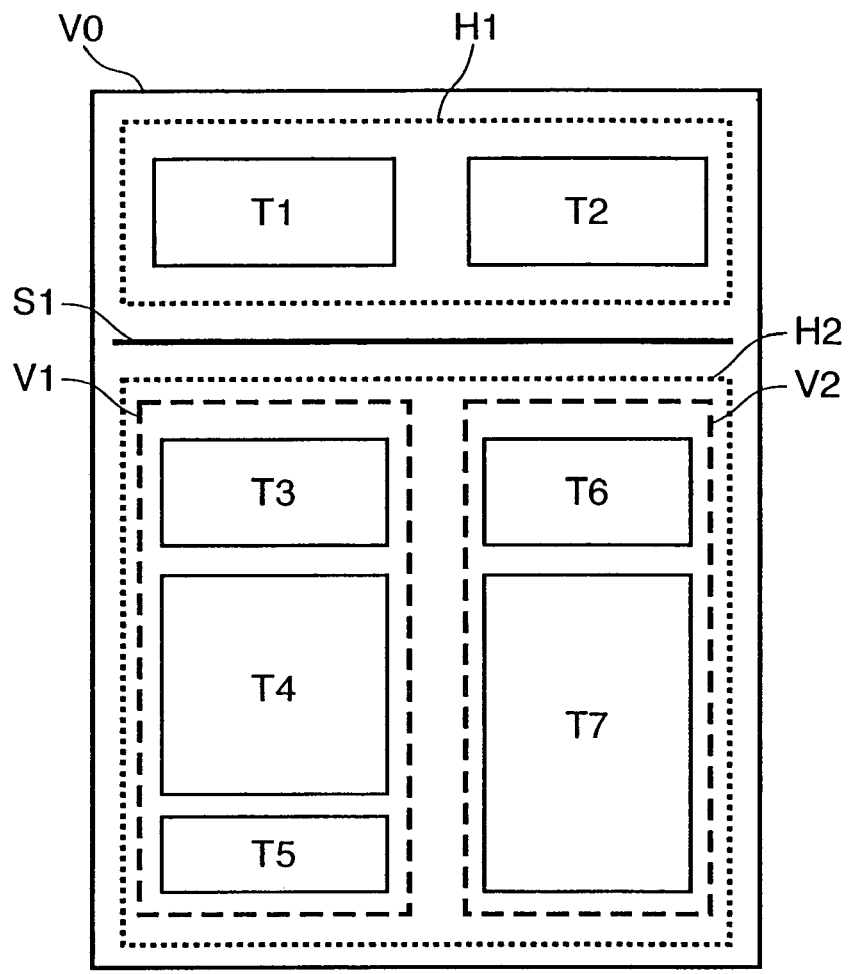
FIGS. 13A and 13B are views for explaining the outline of a document structure tree.
Figure 13B:
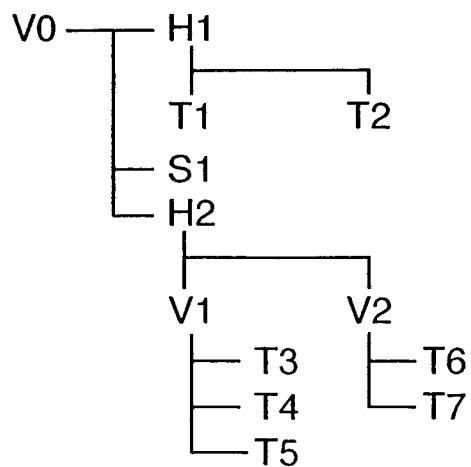

FIG. 12 is a flowchart for explaining detailed process procedures of the document structure tree generation process (step S1102). FIGS. 13A and 13B are views for explaining the outline of the document structure tree. As the basic rule of overall control, the flow of processes transits from a microblock (single block) to a macroblock (a set of blocks). In the following description, a block indicates both a microblock and macroblock.

Regrouping is done for blocks on the basis of association in the vertical direction (step S1102a). Immediately after the start, determination is done for each microblock. Association can be defined when the distance between blocks is small, and blocks widths (heights in case of the horizontal direction) almost equal. The pieces of information of distances, widths, and heights are extracted with reference to the DAOF.

FIG. 13A shows an actual page configuration, and FIG. 13B shows the document structure tree of the page. As a result of grouping in step S1102a, T3, T4, and T5 form one group V1, and T6 and T7 form one group V2. These groups are generated as groups which belong to the same layer.

The presence/absence of a vertical separator is checked (step S1102b). Physically, a separator is an object which has a line property in the DAOF. Logically, a separator is an element which explicitly divides blocks in an application. When a separator is detected, the groups are re-divided in the same layer.

It is determined by using the group length whether no more divisions can be present (step S1102c). For example, it is determined whether the grouping length in the vertical direction equals the page height. If the group length in the vertical direction equals the page height (YES in step S1102c), document structure tree generation is ended. In, e.g., the structure shown in FIGS. 13A and 13B, no separator is present, and the group height does not equal the page height. Since No in step S1102c, the flow advances to step S1102d.

In step S1102d, regrouping is done for blocks on the basis of association in the horizontal direction. Even in this regrouping, the first determination immediately after the start is done for each microblock. Definitions of association and its determination information are the same as those in the vertical direction. In, e.g., the structure shown in FIGS. 13A and 13B, T1 and T2 generate a group H1, and V1 and V2 generate a group H2. The group H1 is generated as a group one level higher than T1 and T2. The group H2 is generated as a group one level higher than V1 and V2. The groups H1 and H2 belong to the same layer.

The presence/absence of a horizontal separator is checked (step S1102e). Since a separator S1 is present in FIGS. 13A and 13B, it is registered in the tree so that the layers H1, S1, and H2 are generated. It is determined by using the group length whether no more divisions are present (step S1102f). For example, it is determined whether the grouping length in the horizontal direction equals the page width. If the group length in the horizontal direction equals the page width (YES in step S1102f), document structure tree generation is ended. If the group length in the horizontal direction does not equal the page width (NO in step S1102f), the flow returns to step S1102a to repeat the process from association check in the vertical direction in the layer higher one level. In, e.g., the structure shown in FIGS. 13A and 13B, since the division width equals the page width, the process is ended. Finally, an uppermost layer V0 representing the entire page is added to the document structure tree.

After the document structure tree is completed, application data is generated in step S1103 on the basis of the information of the document structure tree. A practical example for the structure shown in FIGS. 13A and 13B will be explained below.

Since H1 includes the two blocks T1 and T2 in the horizontal direction, it is output as two columns. Internal information of T1 (text or image as the character recognition result with reference to the DAOF) is output. Then, a new column is set, and internal information of T2 is output. After that, S1 is output. Since H2 includes the two blocks V1 and V2 in the horizontal direction, it is output as two columns. Internal information of V1 is output in the order of T3, T4, and T5. Then, a new column is set, and internal information of V2 is output in the order of T6 and T7. In this way, the conversion process into application data can be done. With this process, the vectorized object can be reused by existing document creation application software.

Figure 14:
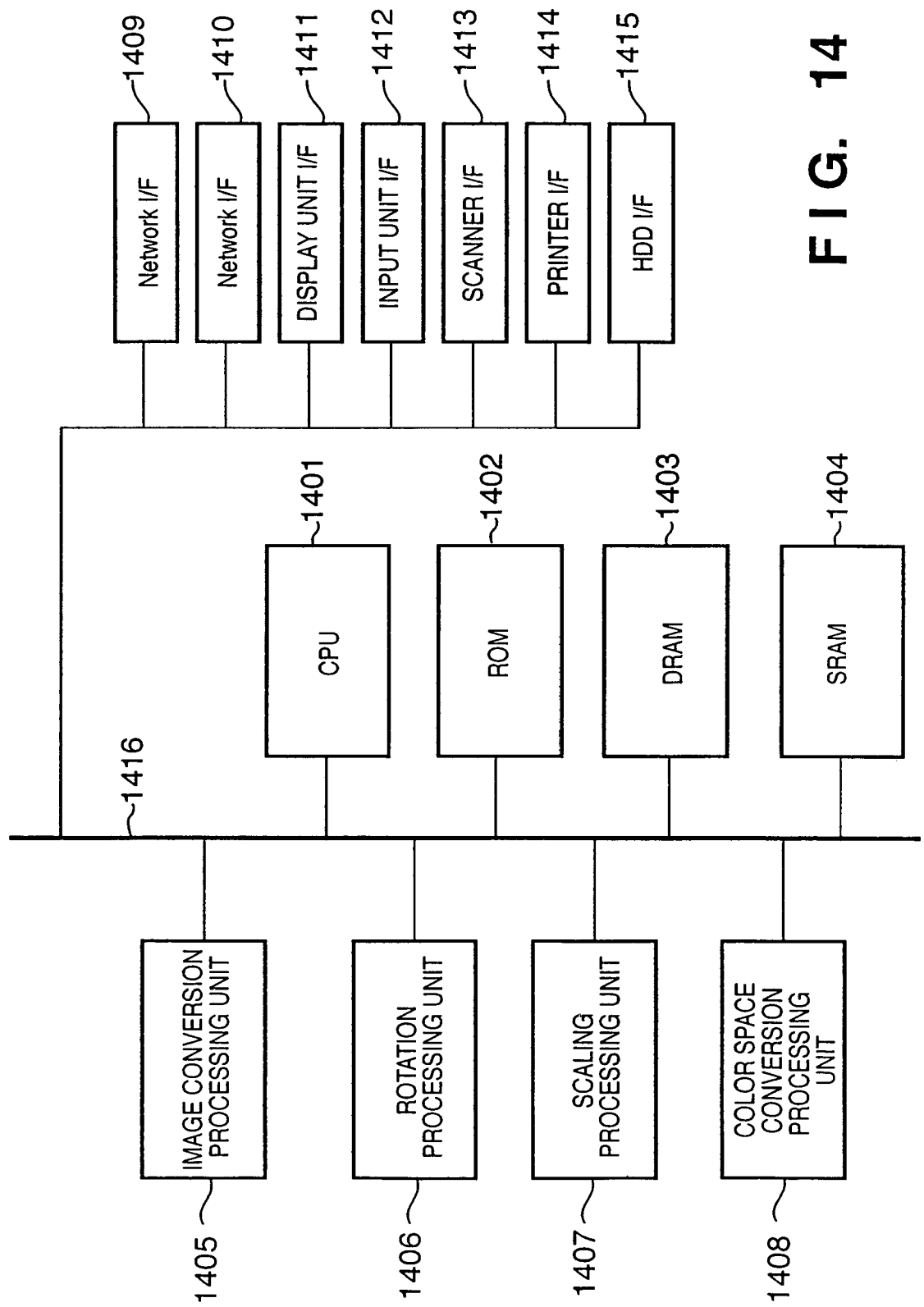
FIG. 14 is a block diagram showing the detailed arrangement of a data processing device 115 in the MFP 100 according to the embodiment.

Details of a process of storing a vector image which matches a search result will be described next. FIG. 14 is a block diagram showing the detailed arrangement of the data processing device 115 in the MFP 100 according to this embodiment. As shown in FIG. 14, the data processing device 115 comprises a CPU 1401. Various kinds of operations are performed in accordance with a program stored in a ROM 1402.

Referring to FIG. 14, a DRAM 1403 necessary for the operation is used as a work memory necessary for operating the program or an image memory to store images. An SRAM 1404 stores data to be backed up. An image conversion processing unit 1405 executes conversion from multilevel data to binary data or from binary data to multilevel data. The image conversion processing unit 1405 receives image data from the DRAM 1403 through a data bus 1416 and writes back the converted image data in the DRAM 1403. Reference numeral 1406 denotes a rotation processing unit; 1407, a scaling processing unit; and 1408, a color space conversion processing unit.

Network I/Fs 1409 and 1410 are connected to the network I/F 114 and FAX I/F 117, respectively. A display unit I/F 1411 is connected to the display device 116. An input unit I/F 1412 is connected to the input device 113. A scanner I/F 1413 is connected to the image reading device 110. A printer I/F 1414 is connected to the printing device 112. An HDD I/F 1415 is connected to the storage device 111.

An image read by the image reading device 110 is accumulated in the DRAM 1403 through the scanner I/F 1413. The image on the DRAM 1403 is manipulated by using the image conversion processing unit 1405, rotation processing unit 1406, scaling processing unit 1407, color space conversion processing unit 1408, and CPU 1401 serving as units to execute image processing in accordance with a mode designated by the input device 113. The image data is transmitted from the network I/F 114 through the network I/F 1409 or printed by the printing device 112 through the printer I/F 1414. Simultaneously, the image data is stored in the storage device 111 through the HDD I/F 1415.

In addition, data from the network I/F 1409 is received and accumulated in the DRAM 1403 and storage device 111. The image on the DRAM 1403 is converted by using the image conversion processing unit 1405, rotation processing unit 1406, scaling processing unit 1407, color space conversion processing unit 1408, and CPU 1401 serving as units to execute image processing. After that, the image is transferred to the network I/F 1409 again or transferred to the printer I/F 1414 and printed.

The above-described block selection (BS) process, vectorization process, and application conversion process are installed in the management PC 101 as an application program which runs in cooperation with the MFP 100. More specifically, the above-described scan data or received data from the network I/F 117 is read out from the storage device 111 in cooperation with the MFP 100 and received through the network I/F 114. The received image is processed by the application program.

Figure 15:
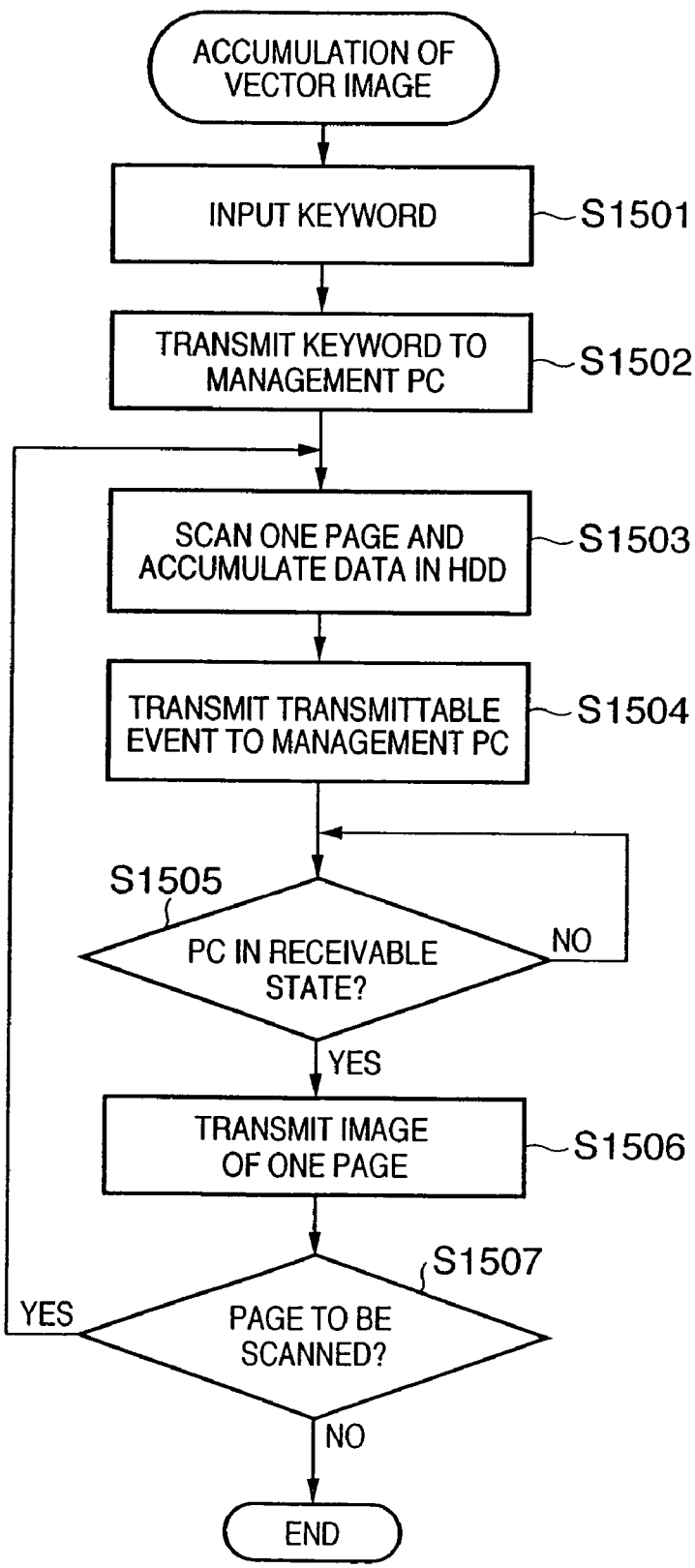
FIG. 15 is a flowchart for explaining a vector image accumulation process in the MFP 100 according to the embodiment.

FIG. 15 is a flowchart for explaining details of a vector image accumulation process in the MFP 100 according to this embodiment. The MFP 100 receives a keyword stored in the management PC 101 in advance and displays the keyword on the display device 116 (step S1501). A keyword selected by using the input device 113 is transmitted to the management PC 101 (step S1502). A scan operation by the image reading device 110 starts.

The MFP 100 scans one page and stores the image in the storage device 111 (step S1503). An event representing that the data can be transmitted is transmitted to the management PC 101 (step S1504). It is determined whether the management PC 101 is in a receivable state (step S1505). If the management PC 101 is in the receivable state (YES in step S1505), an image of one page is read out from the storage device 111 and transmitted to the management PC 101 (step S1506). If the management PC 101 is not in the receivable state (NO in step S1505), the process waits until the management PC 101 is set in the receivable state, and the determination in step S1505 is continued.

After the image is transmitted in step S1506, it is determined whether an image to be scanned is present (step S1507). If such an image is present (YES in step S1507), the flow returns to step S1503 to repeat the above-described operation. If no image is present (NO in step S1507), the accumulation process is ended.

Figure 16:
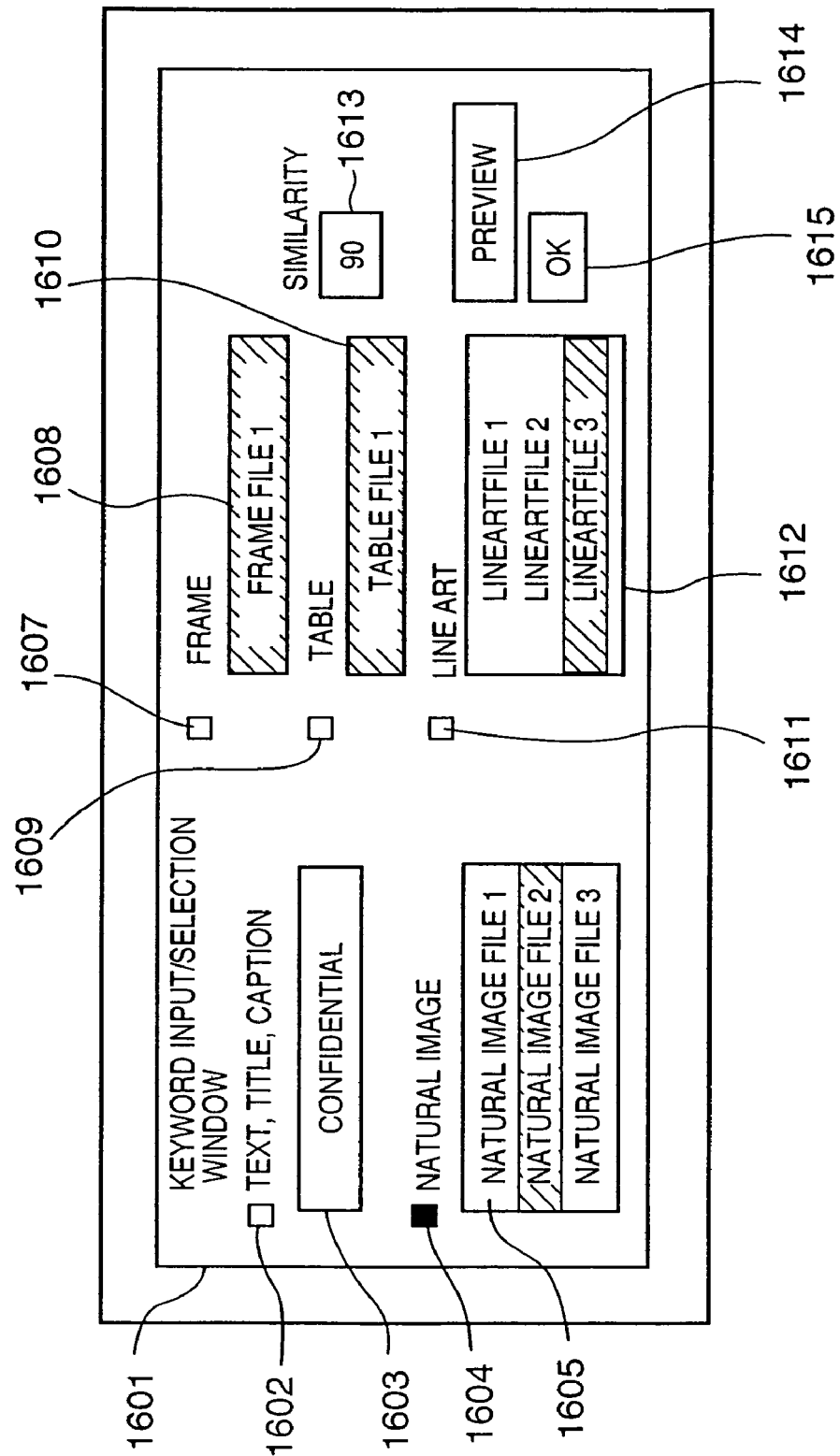
FIG. 16 is a view for explaining a detailed example of a keyword selection process in step S1501.

FIG. 16 is a view for explaining a detailed example of the keyword selection process in step S1501. The keyword is information to inhibit copy, printing, transmission, and reuse in principle and can include characters such as "banned" or "confidential" or an image or mark representing it. Referring to FIG. 16, reference numeral 1601 denotes a keyword input/selection window displayed on the display screen. A file or a character string serving as a keyword of an unvectorized object such as text, natural image, frame, table, or line art can be selected in this window. A check box 1602 is used to select a keyword to search for a character string such as text, title, or caption. A display box 1603 is used to display a keyword registered in the management PC 101. Instead of selecting a keyword, it may be input by using the input device 113. If an object serving as a keyword is a natural image, it can also be read by the image reading device 110 and registered.

A check box 1604 is used to select a keyword to search for a natural image. A display box 1603 is used to display a file serving as a keyword, which is stored in the management PC 101. A check box 1607 is used for a frame. A display box 1608 is used to display a keyword file of a frame. A check box 1609 is used for a table. A display box 1610 is used to display a keyword file of a table. A check box 1611 is used for a line art. A display box 1612 is used to display a keyword file of a line art.

A box 1613 is used to input a similarity. If the similarity is equal to or more than the value displayed in the box 1613, it is regarded that two keywords match. A button 1614 is used to display a preview of the above-described selected file. An OK button 1615 is used to validate setting.

Figure 17:
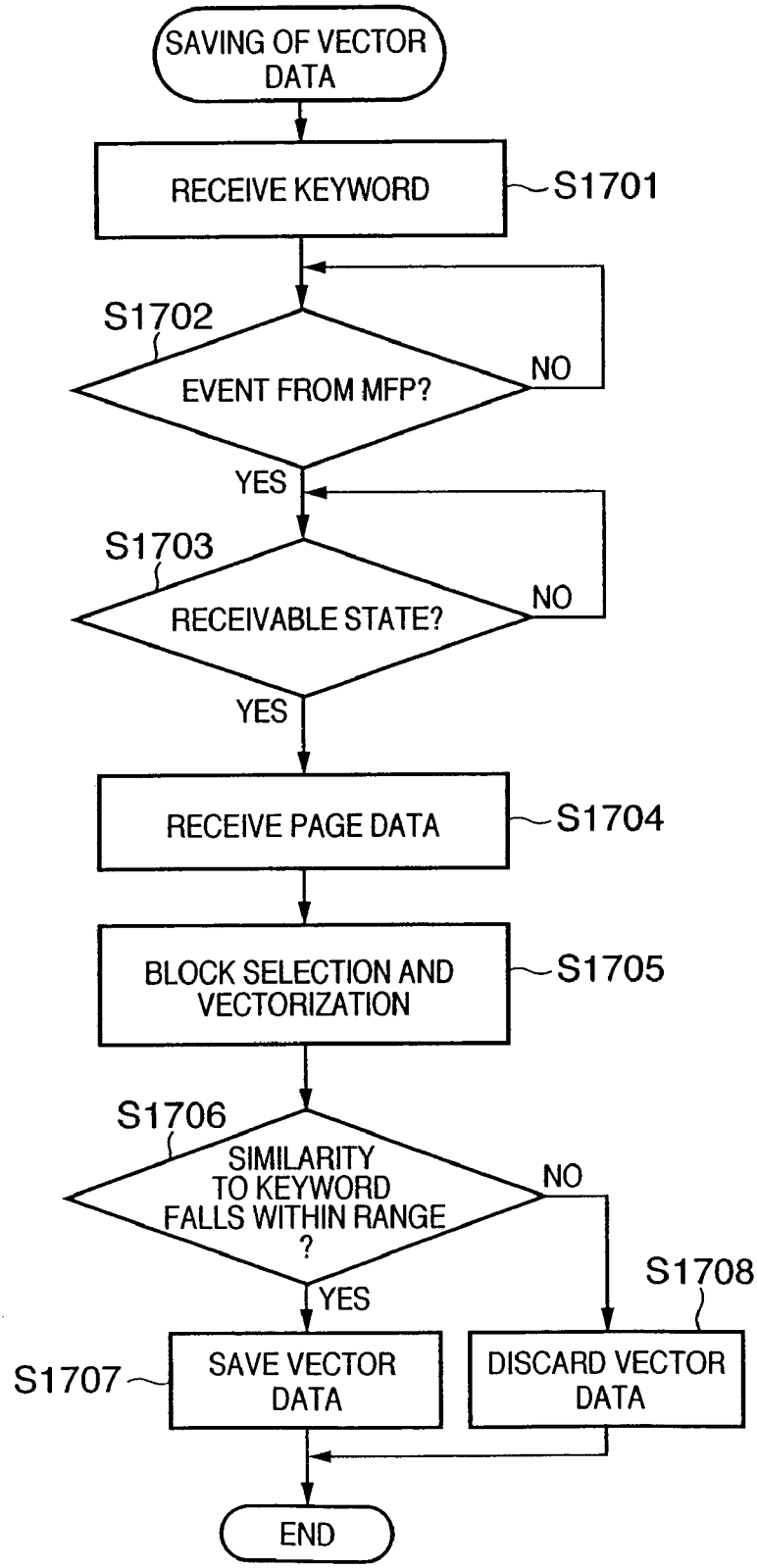
FIG. 17 is a flowchart for explaining operation procedures of a management PC 101 to save vector data.

FIG. 17 is a flowchart for explaining operation procedures of the management PC 101 to save vector data. The management PC 101 receives a search keyword to store a vectorized image which is transmitted from the MFP 100 in step S1507 in FIG. 15 described above (step S1701). The management PC 101 continues the standby state until it is determined that the search keyword is received (step S1702).

After the search keyword is received, it is determined whether the management PC 101 is in an image receivable state (step S1703). If the management PC 101 is in the image receivable state (YES in step S1703), the management PC 101 receives page data transmitted from the MFP 100 (step S1704). The block selection process and vectorization process are executed for the received page data (step S1705). The similarity to the keyword received from the MFP 100 is checked (step S1706).

If the similarity falls within a set range (e.g., equal to or more than a set numerical value) (YES in step S1706), the vector data is saved (step S1707). If the similarity does not satisfy the set value (NO in step S1706), the generated vector data is discarded (step S1708).

Figure 18:
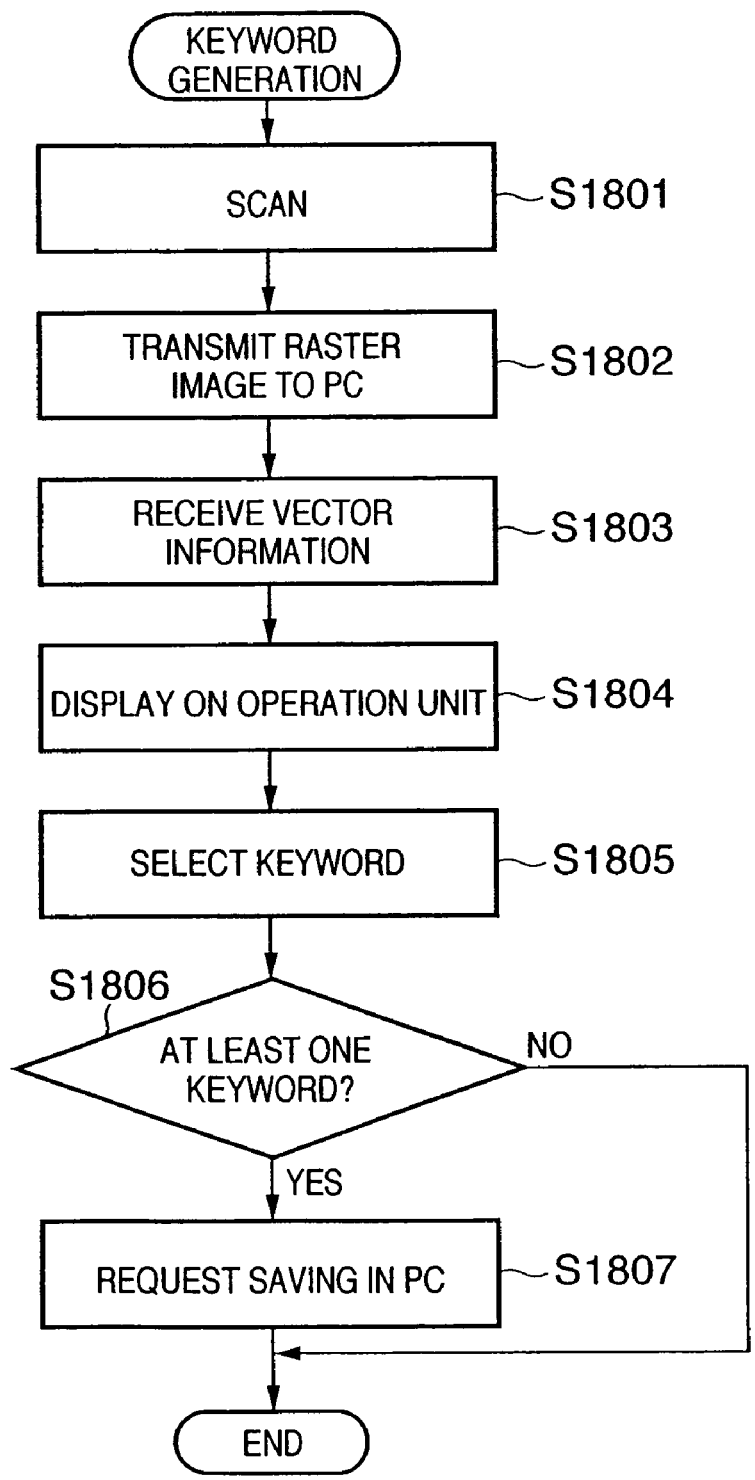
FIG. 18 is a flowchart for explaining keyword generation procedures of the image processing system according to the embodiment.

FIG. 18 is a flowchart for explaining keyword generation procedures of the image processing system according to this embodiment. The MFP 100 scans a document (step S1801). The raster image obtained by scanning by the MFP 100 is transmitted to the management PC 101 (step S1802). The management PC 101 receives vectorized information from the MFP 100 (step S1803) and displays it on the display device (step S1804).

The management PC 101 causes the user to select a necessary keyword (step S1805) and determines whether at least one keyword is present (step S1806). If at least one keyword is present (YES in step S1806), the management PC 101 is requested to save the keyword (step S1807). With this process, the management PC 101 saves the requested keyword and uses it in keyword selection described in the flowchart in FIG. 17. If no keyword is present (NO in step S1806), the process is ended.

An example wherein the similarity to the keyword is high in the determination process in step S1706 will be described. In this embodiment, the similarity of a character string is determined on the basis of the number of characters which match a keyword. For example, when a character string "This is ABCD" is input in correspondence with a keyword "This is ABEF", eight of the 10 characters match. Hence, the similarity is 80%.

For a natural image, the similarity can be calculated from the mean square error, as indicated by equation (1). In equation (1), Key is the pixel value of a keyword, and Image is the pixel value of a scan image.

$$\text{Similarity}(\%) = \frac{\sum_{xy}((\text{Key} - \text{Image})^2/\text{Key})}{\text{xy\_pixel\_count}} \times 100 \quad (1)$$

Figure 19:
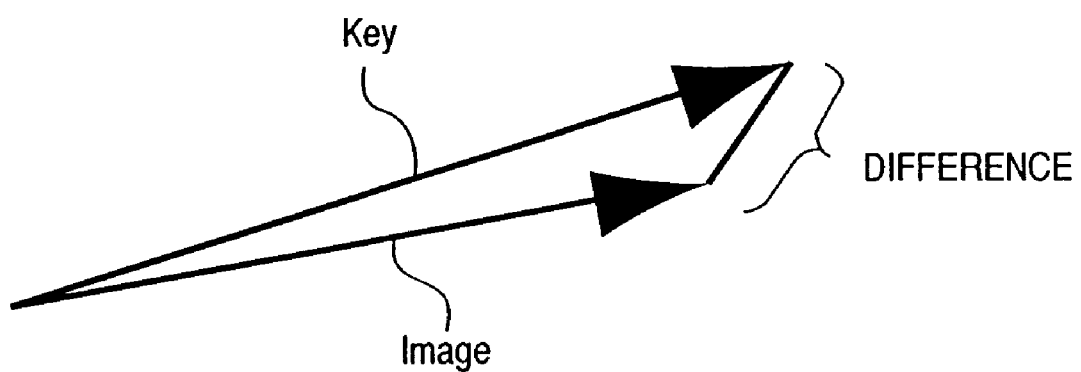
FIG. 19 is a view showing the difference vector between a vector image as Key and scanned Image.

For a table, frame, or line art, the similarity can be calculated from the number of columns or the relative length of a line which is present at a relatively coincident place. Alternatively, Image is multiplied by a ratio of a vector image as Key and the vector image of scanned Image to correct the size. After correction is done as shown in FIG. 19, the difference vector (Key−Image) is obtained. Then, the similarity can be calculated from the mean square error. FIG. 19 is a view showing the difference vector between a vector image as Key and scanned Image.

As described above, according to the image processing system of this embodiment, only data which match keywords and have a set similarity or more remain in the management PC 101 as vector images. Hence, the image storage area to store image data can be small, and only necessary data can be left. Vector data is stored with reference to user's department management data or in correspondence with the date/time. Hence, who has stored the data and when the data is stored can easily be searched later.

When a predetermined text is used as an object serving as a keyword, determination can be done in accordance with a character type based on character codes. The size, color, and shape of each character are not used for determination. As compared to a process of comparing image patterns, the determination process can greatly be simplified. In addition, the memory to register the image patterns can also efficiently be used.

When graphic information converted into a function is used as a keyword, determination can be done on the basis of the feature of the function (the size and color of a graphic are not used for determination). Hence, the same effect as in text can be obtained.

When it is determined that at least one of objects contained in scanned image information is similar to input keyword information, not only the object portion but also vector data generated from the image information may directly be stored in the storage device. With this arrangement, when a document with a text "secret" or the company's logotype is copied without permission, the entire document can be stored as vector data. If the storage device has an extra capacity, image information before vectorization may be left.

A process of scanned image information has been described above. However, the present invention is not limited to this. The present invention can be applied to various kinds of processes of, e.g., printing, transmitting, or storing, in a memory, image information received from a device on a network, image information received by facsimile, or image information read out from a memory.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

According to the present invention, it is determined whether a vectorized input image contains predetermined object information. If the image contains the predetermined object information, the data is stored as vector data. An input image containing a predetermined object can be specified and saved as vector data. Hence, the memory of the system can efficiently be used. In addition, tracking from saved data can easily be done.

It is determined whether keyword information contained in an input image matches a predetermined keyword. If it is determined that the keyword information matches the keyword, the data is stored in correspondence with specific property information. Hence, the determination process can be facilitated as compared to a process of comparing image patterns.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-200806 filed on Jul. 7, 2004, which is hereby incorporated by reference herein.

What is claimed is:

1. An image processing system comprising:
 an input unit adapted to input image information;
 a vectorization unit adapted to generate vector data from the image information input by said input unit;
 a display unit adapted to display plural items of object information;
 a selecting unit adapted to select, based on an instruction from a user, predetermined object information from among the plural items of displayed objection information;

a determination unit adapted to determine whether information similar to the predetermined object information selected by using said selecting unit is contained in the vector data generated by said vectorization unit;

a storage unit adapted to store the vector data when said determination unit determines that information similar to the predetermined object information is contained in the vector data, while it does not store the vector data when said determination unit determines that information similar to the predetermined object information is not contained in the vector data; and a segmentation unit adapted to segment the image information into a plurality of objects, wherein said determination unit determines independently for each of the objects segmented by said segmentation unit whether information similar to the predetermined object information is contained.

2. The system according to claim 1, further comprising an authentication unit adapted to authenticate a user, wherein said storage unit stores, in correspondence with the vector data, information about the user authenticated by said authentication unit.

3. The system according claim 1, further comprising a setting unit adapted to set a determination value to determine a similarity between the predetermined object information and the information contained in the vector data, wherein when the similarity is larger than the determination value, said determination unit determines that information similar to the predetermined object information is contained in the vector data.

4. The system according to claim 1, wherein said vectorization unit generates vector data containing text information extracted from the image information, said display unit displays text information as the predetermined object information, and said determination unit determines a similarity between the text information contained in the vector data generated by said vectorization unit and the text information selected by said selecting unit.

5. The system according to claim 1, wherein said input unit inputs the image information obtained by optically reading a paper document.

6. The system according to claim 1, wherein said input unit acquires image information held by another device through one of wire communication and wireless communication.

7. The system according to claim 1, further comprising a format conversion unit adapted to convert the image information into a format processable by predetermined document creation software.

8. An image processing method comprising:

an input step of inputting image information;

a vectorization step of generating vector data from the image information input in the input step;

a displaying step of displaying plural items of object information;

a selection step of selecting, based on an instruction from a user, predetermined object information from among the plural items of displayed objection information;

a determination step of determining whether information similar to the predetermined object information selected in the selection step is contained in the vector data generated in the vectorization step;

a storage step of storing the vector data when it is determined that information similar to the predetermined object information is contained in the vector data in said determination step while not storing the vector data when it is determined that the information similar to the predetermined object information is not contained in the vector data in said determination step; and a segmentation step of segmenting the image information into a plurality of objects, wherein said determination step determines independently for each of the objects segmented by said segmentation step whether information similar to the predetermined object information is contained.

9. A computer-readable storage medium storing a program to cause a computer to execute;

an input procedure of inputting image information:

a vectorization procedure of generating vector data from the image information input in the input procedure;

a displaying procedure of displaying plural items of object information;

a selection procedure of selecting, based on an instruction from a user, predetermined object information from among the plural items of displayed object information;

a determination procedure of determining whether information similar to the predetermined object information selected in the selection procedure is contained in the vector data generated in the vectorization procedure;

a storage procedure of storing the vector data when it is determined in the determination procedure that the object information similar to the predetermined object information is contained in the vector data in said determination procedure, while not storing the vector data when it is determined that the information similar to the predetermined object information is not contained in the vector data in said determination procedure; and a segmentation procedure adapted to segment the image information into a plurality of objects, wherein said determination procedure determines independently for each of the objects segmented by said segmentation procedure whether information similar to the predetermined object information is contained.

* * * * *